(12) United States Patent
Rettenmaier

(10) Patent No.: US 6,615,991 B1
(45) Date of Patent: Sep. 9, 2003

(54) FILTER AID

(75) Inventor: Josef Otto Rettenmaier, Rosenberg (DE)

(73) Assignee: Stefan Herzog, Munich (DE)

( * ) Notice: Subject to any disclaimer, the term of this patent is extended or adjusted under 35 U.S.C. 154(b) by 0 days.

(21) Appl. No.: 09/601,845

(22) PCT Filed: Jan. 9, 1999

(86) PCT No.: PCT/EP99/00089

§ 371 (c)(1),
(2), (4) Date: Sep. 27, 2000

(87) PCT Pub. No.: WO99/39806

PCT Pub. Date: Aug. 12, 1999

(30) Foreign Application Priority Data

Feb. 9, 1998 (DE) .......................... 198 04 882

(51) Int. Cl.⁷ .......................... B01D 39/00; B01D 39/18
(52) U.S. Cl. .................. 210/503; 210/488; 210/489; 210/500.1; 210/500.29; 210/505
(58) Field of Search ................. 210/488, 489, 210/490, 491, 503, 504, 505, 506, 507, 508, 500.27, 500.29, 500.1

(56) References Cited

U.S. PATENT DOCUMENTS 5,055,314 A * 10/1991 Fernyhough ................ 210/506
5,554,287 A * 9/1996 Beck et al. ............ 210/500.29

FOREIGN PATENT DOCUMENTS

| DE | 29 40 390 | 4/1980 |
|----|-----------|--------|
| DE | 29 15 677 | 11/1980 |
| DE | 41 19 288 | 12/1992 |
| DE | 43 09 845 | 9/1994 |
| EP | 0 379 599 | 8/1990 |
| EP | 0 391 687 | 10/1990 |
| GB | 2257053 A | * 1/1993 |

OTHER PUBLICATIONS

Patent Abstracts of Japan, "Composite for Filtration and Clarifying Method for Liquid", Appln. No. 54108328, (Aug. 24, 1979), Abstract of Kamibayashi Toshiaki, JP 56–033, 018, (Apr. 3, 1981), 1 page.
Willmar, H., "The Use of Starch and Cellulose", *Brauwelt*, 4, pp. 126–129, (1985) (No Translation).
Wackerbauer, K. et al., "P & S Filtration in Practical Trials", *Brauwelt*, 35, pp. 1680–1689, (1989) (No Translation).
"Ullmann's Encyclopedia of Industrial Chemistry", 3ʳᵈ Edition, (1951), vol. 1, p. 492–493, key word "Felted Layers" and p. 494, key word "Filter Aids" (No Translation).
Speckner, J., "Cellulose as Filter Aids", *Brauwelt*, 124 (46), pp. 2058 to 2066 (1984) (No Translation).
Neumueller, Dr. Otto–Albrecht, "Roempps Chemie–Lexikon", *Cellulose*, pp. 623–626, No Translation, (1979).

* cited by examiner

*Primary Examiner*—John Kim
(74) *Attorney, Agent, or Firm*—Foley & Lardner

(57) ABSTRACT

A filter aid, in particular for filtering beverages by means of precoated filters, comprises a mixture of exclusively natural components, e.g. cellulose components. The filter aid is made only of sustainable raw materials and can be degraded almost totally in a natural way.

15 Claims, No Drawings

FILTER AID

Cellulose-based filter aids have been known for a long time ("Ullmann's Encyclopedia of Industrial Chemistry, 3rd edition (1951), first volume, page 492, key word "felted layers" and page 493, key word "filter aids"). Cellulose is produced in a multi-step chemical process, in which all sensorially active materials are removed from the raw material.

Hence filter aids made of pure cellulose are used wherever the sensorial neutrality of the used filter aid is of great significance. Examples of cellulosic filter aids are EFC (low extract cellulose), fine powder cellulose, fine fibrillated cellulose, cationized powder cellulose, fine MCC (microcrystalline cellulose).

In contrast, filter aids made of untreated woodpulp are produced by mechanical comminution, thus only by physical treatment, and can, thus, release extractives (color, odor, flavor) during filtration. Therefore, the use of natural wood fiber-based filters is usually limited to industrial filtrations, where relatively little demand is placed on the sensory analysis. Not only for filtration in the food and luxury food sector, e.g. for sugar solutions (glucose, dextrose, fructose), molasses, dye solutions, fats and oils and the like, but also for many industrial applications, they may be considered only if either the subsequent refining or the complete removal of undesired components (activated charcoal, ion exchanger, etc.) or if the extractives substances cannot have a negative impact on the process (lamination or neutralization due to dyes and odorous substances intrinsic to the process).

The difficult sector of beverage filtration demands, on the one hand, complete sensorial neutrality of the used filter aid; on the other hand, the number of alternatively used filter aids is limited for economic reasons, since the maximum expense for the filter aid is fixed by the price of the mineral filter aids dominating this market.

Usually beverages are filtered in two steps. The first step usually involves mechanical separation methods (e.g. centrifuges) or a coarse filtration, during which operation the liquid usually passes through a precoat layer of a filter aid. This step is frequently followed by a fine filtration operation.

The standard filter aid for filtering by means of a precoated filter in the beverage, especially beer, sector, is kieselguhr. A high percentage of the world beer production is clarified by kieselguhr filtration. Currently it exceeds more than 1.1 billion hl of beer.

It is estimated that the total demand for filter aids worldwide is approximately 1 million tons per year, where inorganic materials, such as kieselguhr, perlite or bentonite, constitute by far the largest share of this amount. Of this total amount about 250,000 tons to 300,000 tons per year are consumed worldwide by the beverage industry, largely by breweries, but also by producers of wine and fruit juices.

To date the number of filter aids, which are based on organic, sustainable raw materials (cellulose, woodpulp, etc.), has been only approx. 60,000 tons per year, even though their use offers a plurality of advantages over inorganic filter aids.

The specific consumption can be up to 70% lower as a result of the low wet cake density (compared to mineral filter aids). At the same time the fibrous structure, the fissured surface and the high porosity often result in a higher flow rate and longer filter life. The structure of plant and cellulose fibers allows the filter to respond elastically to pressure thrusts. They bridge minor defects in the filter cloth; their internal interconnectiveness makes subsequent cleaning of the filter cake easier. Furthermore, the use of organic filter aids presents neither a health risk nor harmful effects for the environment and nature. Pumps and conveying elements of the filtration systems are protected as much as possible owing to the non-abrasive property. Finally the spent filter cakes can be easily disposed, for example, through land management, composting or animal fodder.

Of course, organic filter aids are to some extent many times more expensive than kieselguhr or they exhibit filtration properties that do not completely match those of kieselguhr.

For this reason organic filter aids have not been able to prevail to date against kieselguhr or are used in any case together with kieselguhr (J. Speckner's report "Cellulose as Filter Aids" in the journal "Brauwelt", vol. 124 (1984), issue 46, pages 2058 to 2066, in particular page 2062, left column at the top).

However, using kieselguhr has become increasingly a problem. It arises predominately from the fact that the users have become increasingly more critical in their attitude toward kieselguhr, since diverse studies have suggested in the interim that specific types of kieselguhr pose lung problems.

Strict regulations, which are being asserted and observed more and more in Germany, apply to the handling of kieselguhr.

Another factor is that the disposal of kieselguhr is becoming increasingly more critical in industrial countries. In many places kieselguhr-containing filter residues must be brought to the landfill, a condition that results in a high cost. In contrast, organic filter aids can be tied in again into the natural raw material cycle through composting or animal fodder, a condition that relieves the landfill and provides closed disposal plans.

If contaminated filter cakes from chemical applications have to be fed to thermal utilization, the high ash content and low intrinsic fuel values of mineral filter aids pose a problem.

The result of these urgent problems has been to investigate the possibility of replacing mineral filter aids, especially kieselguhr, when filtering beverages and similar liquids. For a long time, these investigations have paid special attention to using cellulose as a filter aid. Of course, cellulose has been known for a long time as a filter aid. However, for the present invention the issue is using cellulose in the final step of beer filtration which is supposed to largely remove germs and correspondingly stabilize the product (see J. Speckner "Cellulose as a Filter Aid", Brauwelt, vol. 124 (1984), issue 46, pages 2058 to 2066; K. Wackerbauer and R. Gaub "P & S Filtration in Practical Trials", Brauwelt (1989), issue 35, pages 1680–1689).

As a sustainable natural material, cellulose is relatively easy to obtain and passes effortlessly again into the natural cycle without leaving behind any harmful effects.

Therefore, there already exist attempts to provide a filter material that is made exclusively of cellulose and cellulose derivatives, and that exhibits no components that are harmful to human health or the environment and whose separation efficiency is at least just as high as that of the prior art asbestos-free deep bed filter layers, and that exhibits very few extractable components (DE 43 09 845 C2).

However, the prior art filter aids exhibit a cellulose acetate fiber content ranging up to 50 percent by weight of the total quantity. As a structural component that provides the internal interconnectivity, the cellulose acetate fibers are to be present in a quantity of up to 50% of the total weight of the filter aid. Both microcrystalline and microfine cellulose are distributed homogeneously and embedded in the structure. They can move in the structure and thus have a homogenizing effect on the filter layer.

The requisite cellulose acetate for the filter aid, according to the DE 43 09 845 C2, constitutes a plastic material, which exhibits no natural organic components and is not degradable in the same manner as the cellulose content of this filter aid.

The invention is based on the problem of providing a filter aid, which is made of sustainable raw materials and is naturally degradable.

The problem is solved from one point of view by the invention disclosed herein.

Hence all of the components of the filter aid are to be natural materials, which can pass again into the natural cycle by means of decay or other natural decomposition. That does not mean that the natural organic components may not contain any inorganic contents. However, they should be characterized predominantly by their organic nature. Even cellulose has an ash content of approximately 1.0 percent by weight. Inorganic contents of up to about 5% by weight of the total quantity of the filter aid do not oppose in the present connection classification as an exclusively natural organic component.

How high the percentage of the individual components of the mixture is chosen depends on the type and degree of the loading on the liquid to be filtered, in the case of beer, for example, on the turbidity. If the turbidity is high or the size of particles that are dragged in increases, the percentage of coarser components in the filter aid increases. If the turbidity is low and the particles that are dragged in are finer, the filter layer formed with the filter aid must be denser and thus contains more finer components.

The components of the filter aid are not characterized by their dimensions, because the dimensions for the filtering efficiency of a filter layer, formed with a specific component, are not absolutely conclusive. For the filtering efficiency the shape of the particles of the individual component and their surface properties can have a significant effect.

Therefore, a filter functional value in the form of the water value was chosen to describe the fineness of the mixture. This water value is a measure for the permeability of a filter mass and thus independent of the external formation of the particles of the component concerned.

The water value is determined with a laboratory pressure filter (diameter 50 mm) and an elevated water tank with level control. A 2 m difference must be kept between the level of the water in the elevated water tank and the filter bottom. The laboratory filter is provided with a wetted, permeable layer of cellulose (Schenk D layer with the sieve side facing downward) and closed. Then 25 g filter aid are slurried in 200 to 300 ml pure water and completely passed into the lab filter. The lab filter is attached to the elevated water tank and purged. After one minute 500 ml water are removed via a filter and then the time for the next 100 ml filtrate is measured. The water value follows from the measured time as follows:

$$\text{water value} = \frac{480}{\text{time in minutes}}$$

If the result is a water value of less than 150, the determination is done as above, but with the use of only 4 g of filter aid. Then the result is:

$$\text{water value} = \frac{76.8}{\text{time in minutes}}.$$

Hence the shorter the time, required for a specific volume of water to flow through the filter layer, the higher is the water value.

It has been demonstrated that it is possible to obtain filter aids, whose filter efficiency can reach those of the prior art kieselguhr filters, by combining natural organic components with the corresponding water value of the mixture. At the same time, the entire filter aid is made of sustainable and naturally degradable materials. In the case of the mixture, it is no longer necessary to use extraneous builders.

The invention also addresses the clarity, i.e., the residual turbidity remaining in the filtrate after passing through the filter.

The EBC value is a measure for the turbidity (EBC= European Brewery Convention). An EBC value of up to about 30 means low turbidity; EBC values of about 30 to 120, high turbidity. The turbidity in the experiments was measured using a 90° scatter light photometer KT 30 from Sigrist.

The natural organic components can be cellulose component or be made directly from cellulose, obtained, for example by delignifying wood particles.

One component, which in interaction with cellulosic materials can yield a filtration relevant synergy effect, is a polyglucoside, for example in the form of starch, in particular wheat starch.

All percentages in this text are given as percent by weight (i.e., "wt %").

The use of starch and cellulose per se is described in H. Willmar's article "The Use of Starch and Cellulose" in the journal "Brauwelt" (1985), issue 4, pages 126–129.

Should the liquids be heavily loaded with turbid material, if possible, a significant percentage of coarser cellulose with a water value ranging from 2,500 to 1,200 may be added to the aid.

This cellulose content forms in turn a structure, which prevents the filter aid from disintegrating and prematurely clogging the filter layer with the larger quantity of turbid material.

In many cases, it is also recommended that 20 to 75% cellulose with a water value ranging from 1,200 to 600 be added to the filter aid, hence a somewhat less coarse cellulose for unfiltrate that is not so severely turbid.

It can also be advantageous to add 1 to 30% of cationized cellulose with a water value ranging from 900 to 50 to the filter aid.

Cationized cellulose means a cellulose, where the surface of the particles is treated, for example, with a surfactant or resin. In so doing, the adsorptiveness can be changed as desired. In this manner, components that the filter could not otherwise retain are filtered out of the liquid.

It can be expedient to add to the filter aid a moiety of CTMP (chemical thermal mechanical pulp) and/or a moiety of EFC, i.e., a filter aid, which comprises plant fibers subjected by a special method to a liquid treatment described in the German patent application 197 10 315.4- 27, which is incorporated herein by reference.

The water value of this addition is advantageously in the range of 150 to 10.

The water values, may be regarded as orientation values for adjusting the filter aid mixture as a function of the turbidity of the unfiltrate.

The filter aid can exist in the form of pourable material of fine particle size, with which precoat filter layers can be produced, or as a shaped body, i.e., for example as a filter plate.

Filtration with a customary inorganic filter aid is compared with the cellulosic filter aid (Cell. FHM) of the invention below.

Beer with an initial turbidity value of <40 EBC, which was filtered in a precoat filter, serves as the liquid to be filtered.

The experiments were conducted with a laboratory glass filter. In so doing, the first and the second precoat of the filter aid, suspended around water, was pumped in with a metering pump, which, after building up the precoat, also accomplishes the so-called metering, i.e. a constant additional feed of the suspended filter aid during the actual filtration process. The following data in g relate to the quantity of respective material contained in the suspensions yielding the precoats and the metering. The suspension is obtained with the following quantities of water:

| a. | first precoat (VA): | 8 liters of water |
|---|---|---|
| b. | second precoat: | 10 liters of water |
| c. | metering: | 10 liters of water |

The delivery quantities of the pumps were as follows:

| metering pump flow: | 7.2 liters per hour |
|---|---|
| filter pump flow: | 40.2 liters per hour |

During the respective metering operations the flow of the metering pump was reduced to half. The results were the following precoat periods:

| a) | first precoat: | precoat time: 8.4 min. |
|---|---|---|
| b) | second precoat: | precoat time: 13.0 min. |

During precoating and metering, the following substances were used:

| Coarse Filtration: | |
|---|---|
| Inorganic Filter Aid | |
| 1. Precoat (VA): | 46.4 g Hyflow Supercel |
| | 18.6 g Harbolite P 400 |
| 2. Precoat (VA): | 121.2 g Hyflow Supercel |
| | 12.3 g Celatom FPl SL |
| Metering: | 25.6 g Hyflow Supercel |
| | 105.1 g Celstrom FP1 SL |
| | 2.6 g Becofloc 7 |
| Cellulosic Filter Aids | |
| 1. Precoat (VA): | 65.0 g ARBOCEL BZN 600-30 PH |
| 2. Precoat (VA): | 45.2 g ARBOCEL BNZ 600-30 PH |
| | 37.1 g wheat starch PT20002 |
| | 12.5 g Vivapur 99 |
| | 2.6 g Becofloc 7 |
| Water value of the kp1 precoat layer | approx. 140 |
| Metering: | analogous to the second precoat |
| Fine Filtration | |
| Inorganic Filter Aids | |
| 1. Precoat (VA): | 46.4 g Hyflow Supercel |
| | 18.6 g Harbolite P 400 |
| 2. Precoat (VA): | 164.8 g Harbolite P 400 |
| | 24.6 g Celatom FPl SL |
| | 1.0 g Becofloc 10 |
| Metering: | 105.1 g Celatom Fp1 SL |
| | 2.6 g Becofloc 10 |
| Cellulosic Filter Aids | |
| 1. Precoat (VA): | 58.5 g ARBOCEL BZN 600-30 PH |
| | 6.5 g ARBOCEL L 600-10 |
| 2. Precoat (VA) : | 59.1 g ARBOCEL BZN 600-30 PH |
| | 59.1 g wheat starch C* gel 20006 |
| | 20.5 g Vivapur 99 |
| | 2.6 g Becofloc 10 |
| Water value of the kp1 precoat layer | approx. 90 |
| Metering: | 32.8 g ARBOCEL BZN 600-30 PH |
| | 32.8 g wheat starch C* gel 20006 |
| | 10.3 g Vivapur 99 |
| | 2.6 g Becofloc 10 |

In the tables above the tradenames that are used have the following meaning:

| Hyflow Supercel = | kieselguhr from World Minerals |
|---|---|
| Harbolite P 400 = | perlite from World Minerals |
| Celatom Fpl SL = | kieselguhr from Eagle Picher |
| Becofloc 7 = | filter flocs from Begerow |
| Becofloc 10 = | filter flocs from Begerow |
| ARBOCEL BZN 600-30 PH = | microfine powder cellulose made of natural fibers |
| ARBOCEL L 600-10 = | |
| Vivapur 99 = | microcrystalline cellulose average particle size approx. 50 $\mu$m |
| wheat starch C* gel 23006 = | wheat starch from Cerestar |

Given these features of the filter, the comparison filtration yielded the following results, where the differential pressure is equivalent to the flow resistance; for which a measure is—to what extent the filter is clogged and it is approaching the end of its service life. The "turbidity" is equivalent to the clarity of the filtrate.

|  | Inorganic Filter Aid | Cellulosic Filter Aid |
| --- | --- | --- |
| Coarse filtration: | | |
| Differential pressure t = 0 min. | 0.3 bar | 0.02 bar |
| Differential pressure t = 150 min. | 1.62 bar | 0.43 bar |
| Differential pressure t = 240 min. | no data* | 1.77 bar |
| Turbidity after 150 min. | 0.42 EBC | 0.70 EBC |
| Turbidity after 240 min. | No data* | 0.52 EBC |

*For inorganic filter aids the experiment was discontinued due to too high differential pressure after 150 min.

|  | Inorganic Filter Aid | Cellulosic Filter Aid |
| --- | --- | --- |
| Fine filtration: | | |
| Differential pressure t = 0 min. | 0.04 bar | 0.02 bar |
| Differential pressure t > 180 min. | 0.63 bar | 0.16 bar |
| Turbidity after 180 min. | 0.18 EBC | 0.20 EBC |

It has been found that the differential pressures after identical filtration periods are significantly lower for the cellulosic filter aid than for the inorganic filter aid, a feature that means that the time of operation before reaching a differential pressure that is no longer acceptable is significantly longer. It also means a saving in filter aids per unit of quantity of the liquid to be filtered. The consumption quantities could be reduced almost 30%, compared to the inorganic filter aid.

What is claimed is:

1. A filter aid for the precoat filtration of beverages, comprising a mixture of:
   10 to 75 wt % cellulose with a water value ranging from about 600 to about 150;
   10 to 45 wt % cellulose with a water value ranging from about 100 to about 10;
   10 to 30 wt % cold water insoluble starch with a water value of <20; and
   the remainder up to 100 wt % being additives, wherein the mixture exhibits a water value of <300.

2. A filter aid, as claimed in claim 1 further comprising 5 to 70wt % cellulose With a water value ranging from 2,500 to 1,200 .

3. A filter aid, as claimed in claim 1, further comprising 20 to 70wt % cellulose with a water value ranging from 1,200 to 600.

4. A filter aid, as claimed in claim 1, further comprising 1 to 30wt % cationized cellulose.

5. A filter aid, as claimed in claim 4, wherein the cationized cellulose exhibits a water value ranging from about 900 to about 50.

6. A filter aid, as claimed in claim 1, comprising at least one further polyglucoside besides starch.

7. A filter aid, as claimed in claim 1, comprising an addition of CTMP (Chemical Thermal Mechanical Pulp).

8. A filter aid, as claimed in claim 1, comprising an addition of EFC (Extract-Free Cellulose).

9. A filter aid, as claimed in claim 8, wherein the water value of the EFC ranges from about 600 to about 10.

10. A filter aid, as claimed in claim 1, wherein the water value of the total mixture is<150 when the turbidity of the unfiltrate is equivalent to a EBC (European Brewery Convention) value of up to about 110, and wherein the water value ranges from by about 150 to about 300 when the turbidity of the unfiltrate is equivalent to a EBC value of >110.

11. A filter aid as claimed in claim 1, wherein the filter aid is formed into shaped bodies.

12. A filter aid as claimed in claim 1, wherein the cellulose with a water value ranging from about 100 to about 10, is microcrystalline cellulose.

13. A filter aid as claimed in claim 1, wherein the filter aid is formed into a plurality of layers.

14. A filter aid as claimed in claim 13, wherein at least one of the plurality of layers contains kieselguhr.

15. A filter for the precoat filtration of beverages, comprising a mixture of:
   10 to 75 wt % cellulose with a water value ranging from about 600 to about 150;
   10 to 45 wt % cellulose with a water value ranging from about 100 to about 10;
   10 to 30 wt % cold water insoluble starch with a water value of <20;
   a pourable material of fine particle size; and
   the remainder up to 100 wt % being additives, wherein the mixture exhibits a water value of <300.

* * * * *